(12) United States Patent
Morel et al.

(10) Patent No.: US 10,411,882 B2
(45) Date of Patent: Sep. 10, 2019

(54) MULTIPARTY SECURE CALCULATION METHOD PROTECTED AGAINST A MALEVOLENT PARTY

(71) Applicant: SAFRAN IDENTITY & SECURITY, Issy-les-Moulineaux (FR)

(72) Inventors: Constance Morel, Issy-les-Moulineaux (FR); Julien Bringer, Issy-les-Moulineaux (FR); Herve Chabanne, Issy-les-Moulineaux (FR)

(73) Assignee: SAFRAN IDENTITY & SECURITY, Issy les Moulineaux (FR)

( * ) Notice: Subject to any disclaimer, the term of this patent is extended or adjusted under 35 U.S.C. 154(b) by 234 days.

(21) Appl. No.: 15/418,352

(22) Filed: Jan. 27, 2017

(65) Prior Publication Data
US 2017/0222798 A1 Aug. 3, 2017

(30) Foreign Application Priority Data
Jan. 28, 2016 (FR) ...................................... 16 50694

(51) Int. Cl.
*H04L 9/06* (2006.01)
*G06F 21/72* (2013.01)
(Continued)

(52) U.S. Cl.
CPC ............ *H04L 9/0643* (2013.01); *G06F 21/72* (2013.01); *H04L 9/14* (2013.01); *H04L 9/30* (2013.01);
(Continued)

(58) Field of Classification Search
CPC . H04L 9/0643; H04L 9/14; H04L 9/30; H04L 9/323; H04L 9/3236; H04L 2209/46; H04L 2209/50; G06F 21/72
See application file for complete search history.

(56) References Cited

U.S. PATENT DOCUMENTS 9,530,052 B1* 12/2016 Pillai .................. G06K 9/00617
9,906,360 B2* 2/2018 Johnson .................. G06F 21/14
(Continued)

FOREIGN PATENT DOCUMENTS

FR 2992124 A1 12/2013

OTHER PUBLICATIONS

Huang et al. "Quid-Pro-Quo-tocols: Strengthening Semi-honest Protocols with Dual Execution." 2012 IEEE Symposium on Security and Privacy (SP) (May 20, 2012). pp. 272-284.
(Continued)

*Primary Examiner* — Techane Gergiso
(74) *Attorney, Agent, or Firm* — Womble Bond Dickinson (US) LLP

(57) ABSTRACT

The invention proposes a method comprising the evaluation of a function F obtained by applying to n sub-functions $f_i$ a first operation, the evaluation comprising:
  the application of a series of calculation steps in which a first unit assumes a role of a client and a second unit assumes a role of a server, and
  the repetition of the series of calculation steps in which the roles of client and of server are exchanged between the units,
each series of steps comprising:
  a) randomly generating, by the server, first data, and a second datum,
  b) for each sub-function $f_i$, generating by the server a set of elements formed by:
    a result of $f_i$ evaluated in the data of the client and of the server,
    masked by a first datum, by applying the first operation between the result and the first datum, and
    masked by the second datum, by applying between the masked result and the second datum of a second operation different from the first and distributed relatively to the latter,
(Continued)

c) recovering by oblivious transfer, by the client, an intermediate datum corresponding to one of the elements generated by the server,
d) generating, by the server, a first result portion, by:
   masking each first datum with the second datum,
   applying to all the first masked data of the first operation, and
e) generating by the client, a second result portion, by applying all the intermediate data of the first operation.

15 Claims, 7 Drawing Sheets

(51) Int. Cl.
   *H04L 9/14* (2006.01)
   *H04L 9/32* (2006.01)
   *H04L 9/30* (2006.01)

(52) U.S. Cl.
   CPC .......... *H04L 9/3231* (2013.01); *H04L 9/3236* (2013.01); *H04L 2209/46* (2013.01); *H04L 2209/50* (2013.01)

(56) References Cited

U.S. PATENT DOCUMENTS

| | | | | |
|---|---|---|---|---|
| 2003/0016770 A1* | 1/2003 | Trans | ...................... | H04B 1/00 375/346 |
| 2007/0116283 A1* | 5/2007 | Tuyls | ...................... | H04L 9/008 380/255 |
| 2008/0208560 A1* | 8/2008 | Johnson | .................. | G06F 21/14 703/22 |
| 2011/0002209 A1* | 1/2011 | Kirovski | .......... | G11B 20/00086 369/53.21 |
| 2011/0096955 A1* | 4/2011 | Voloshynovskiy | ...... | G06K 9/00 382/103 |
| 2011/0302420 A1* | 12/2011 | Davida | .................... | G06F 21/32 713/180 |
| 2013/0243187 A1* | 9/2013 | Horstmeyer | .......... | H04L 9/0656 380/28 |
| 2015/0082399 A1* | 3/2015 | Wu | ...................... | G06F 21/6209 726/6 |
| 2015/0195088 A1* | 7/2015 | Rostami | .................... | G09C 1/00 380/28 |
| 2016/0026825 A1* | 1/2016 | Patey | ...................... | G06F 21/71 726/26 |
| 2016/0119119 A1* | 4/2016 | Calapodescu | ............. | H04L 9/30 380/30 |

OTHER PUBLICATIONS

Bringer et al. "GSHADE: Faster Privacy-Preserving Distance Computation and Biometric Identification." Proceedings of the 2nd ACM Workshop on Information Hiding and Multimedia Security (Jun. 11, 2014). pp. 187-198.

Kiraz et al. "Security and Efficiency Analysis of the Hamming Distance Computation Protocol Based on Oblivious Transfer." International Association for Cryptologic Research, vol. 20150123:054459 (Jan. 23, 2015). pp. 1-10.

Search Report and Written Opinion in French Application No. 1650694 dated Nov. 14, 2016, with English translation coversheet. 13 pages.

* cited by examiner

MULTIPARTY SECURE CALCULATION METHOD PROTECTED AGAINST A MALEVOLENT PARTY

FIELD OF THE INVENTION

The invention relates to a data processing method applied together by two parties, wherein a function of two variables is evaluated in a secure way by both parties, while having as inputs, vectors respectively held by each party.

The invention is notably applied to the protection of confidentiality of the vectors held by the parties, in a context wherein at least one of the parties is malicious, or malevolent.

STATE OF THE ART

From patent FR 2 992 124, a method is known for multiparty secure calculation of a function of several variables, evaluated at data respectively held by the different parties intervening in the calculation. The term "secure" means that at the end of the calculation method for the function, the result is known to at least one of the parties, but no party has learnt any information on the data held by said party or the other parties.

The method described in this patent is applied to the calculation of functions F written as a sum of sub-functions $f_i$ of two variables: $F=\Sigma_{i=1}^{n} f_i$, and to values in the set $\mathbb{Z}_m$ of the integers comprised between 0 and m−1 wherein m is an integer, n is a positive integer corresponding to the number of sub-functions, and i is a mute index with values from 1 to n.

The method is for example applicable to the calculation of a Hamming distance between two biometric data X,Y each comprising n components $x_i$, $y_i$ $X=(x_1, \ldots x_n)$, $Y=(y_1, \ldots, y_n)$, the data being held by two parties.

The calculation of the function is applied as follows.

A first party generates a set of n random values $r_i$ selected from the set $\mathbb{Z}_m$, and generates a set comprising the elements $r_i+f_i(0,x_i)$ and $r_i+f_i(1,x_i)$, for each i from 1 to n.

Both parties then execute a procedure called "oblivious transfer" procedure so that the second party recovers, for each i from 1 to n, depending on the value of the components $y_i$ of its datum Y, one of the two elements generated by the first party and which corresponds to $r_i+f_i(y_i,x_i)$.

Generally, an oblivious transfer is a calculation operation between two parties $P_1$ and $P_2$. In this type of operation, $P_1$ has a list of N indexed elements wherein N is a positive integer, and $P_2$ is aware of the number N of elements of the list and selects an index comprised between 0 and N−1. By oblivious transfer, $P_2$ recovers the $i^{th}$ element of $P_1$, i.e. the element of $P_1$ indexed by i.

$P_1$ does not become aware of any information on the index of the element recovered by $P_2$, and $P_2$ does not recover any information on the other elements of the list held by $P_1$.

There exist several oblivious transfer protocols, which for example are described in the following publications:

Naor et al., *Efficient oblivious transfer protocols*, In Proceedings of the Twelfth Annual Symposium on Discrete Algorithms, Jan. 7-9 2001, Washington, D.C., USA, pages 448-457, 2001.

Asharov et al., *More efficient oblivious transfer and extensions for faster secure computation*, In 2013 ACM SIGSAC Conference on Computer and Communications Security, CCS '13, Berlin, Germany, Nov. 4-8 2013, pages 535-548, 2013.

The oblivious transfer applied to the protocol described hereinbefore implies that the first party does not become aware of any information on the component $y_i$ of the second party, and the second party does not become aware of any information on $r_i+f_i(1-y_i, x_i)$.

Next, the second party sums the data which it has received for each i and obtains a value $T=\Sigma_i(r_i+f_i(y_i, x_i))=R+F(X,Y)$. The first party sums the random values $r_i$ which it has generated for obtaining R.

Next, one of the parties sends its result to the other one in order to obtain by a simple calculation the value of F(X,Y).

In order to evaluate the safety of a method in cryptography, the behavior of the parties is modeled. In particular, a "semi-honest" behavior is defined and a "malicious" behavior of the parties is defined to the method.

A semi-honest party is a party which, even if it tries to obtain information on the data held by the other party, will exactly follow the steps of the method. A malicious party is a party which does not necessarily observe the steps of the method, this in order to attempt to obtain information on the data held by the other party.

For example, a malicious party may distort the values of the $x_i$ in the elements $r_i+f_i(0,x_i)$ and $r_i+f_i(1,x_i)$.

The method described hereinbefore is secure in the case of a semi-honest adverse party if the procedure applied for the oblivious transfer is itself secure against this type of opponent. Indeed, the first party does not learn anything on the inputs of the other party on the one hand since it plays the role of the sender in the oblivious transfer protocol and therefore does not obtain any output. On the other hand, the second party receives $t_i=r_i+f_i(y_i,x_i)$ but this does not reveal any information on the $f_i(y_i,x_i)$ since the $t_i$ and the $f_i(y_i,x_i)$ belong to $\mathbb{Z}_m$ and $r_i$ randomly selected by the other party in $\mathbb{Z}_m$. Therefore, $t_i$ is uniformly random in $\mathbb{Z}m$ and therefore does not reveal any information on $f_i(y_i,x_i)$.

On the other hand, in the case when the first party is malicious, it may learn information on the datum held by the other party, for example by modifying the calculated function so that $f(X,Y)=x_i$.

Moreover, in the case when the second party is malicious, it cannot normally obtain information on the datum held by the first party by means of the random values $r_i$. However if the selection of the values $r_i$ is not really random and that the second party manages to obtain pieces of information on how the $r_i$ are generated, then pieces of information on the datum held by the first party may be inferred therefrom.

Thus, in the case when the parties intervening in the calculation are malicious, the calculation method is not secure, even if the oblivious transfer protocol is secure.

PRESENTATION OF THE INVENTION

The object of the invention is to find a remedy to the problem shown hereinbefore.

In particular, an object of the invention is to propose a multiparty calculation method for a function of data held by several parties which is secure even in the case when the parties are malicious.

Another object of the invention is to propose a method for which the execution time is not considerably increased relatively to the non-secure version in the case of malicious parties.

Another object of the invention is to propose a method for authenticating an individual by a multiparty secure calculation even in the case when one of the processing units intervening in the method is malicious.

In this respect, the object of the invention is a method for executing a cryptographic calculation applied by two processing units, each comprising processing means, and each having a vector comprising a number n of indexed components, the method comprising a secure evaluation of a function F obtained by applying to n sub-functions $f_i$ of several variables of an operation, called first operation with the vectors of each processing unit as inputs of the function, the method being characterized in that it comprises:
application of a series of secure calculation steps in which a processing unit assumes a role of a client and the other processing unit assumes a role of a server, and repetition of the series of secure calculation steps in which the roles of client and of server are exchanged between two processing units, each series of steps comprising:
a) randomly generating, by the server, n first masking data, in the set $\mathbb{Z}_m$ with m being a prime number, invertible for the first operation, and a second masking datum in the set $\mathbb{Z}_m$, invertible for a second operation, different from the first operation, and distributive relatively to the latter,
b) for each sub-function $f_i$, generating by the server a set of elements, each element being formed by:
a possible result of the sub-function $f_i$ evaluated at the datum of the client and the datum of the server,
masked by a first masking datum, the masking being obtained by applying the first operation between the result and the first masking datum, and
masked by the second masking datum, the masking being applied by application between the result masked by the first masking datum and the second masking datum of the second operation,
c) recovering by oblivious transfer, by the client, for each component of its vector, an intermediate datum corresponding to one of the elements generated by the server and indexed with the value of said component,
d) generating, by the server, a first result portion, by:
masking each first masking datum with the second masking datum, and
applying to all said first masked data the first operation, and
e) generating, by the client, a second result portion, by applying to all the intermediate data of the first operation, said second result portion comprising a masked evaluation of the function F with the vectors of the two processing units as inputs,
applying, by two processing units, an equality test on the masked evaluations of the function F obtained at the end of each series of steps, and
if the equality test succeeds, calculating by one of the two processing units, the function evaluated with the data of the two processing units F(A,B) from the first and second result portions, and
using the function evaluated with the data of two processing units in at least one application from among the group comprising a cryptographic application, an identification application, and an authentication application.

Advantageously, but optionally, the method according to the invention may further comprise one of the following features:
the application of both series of steps is achieved simultaneously.
the calculation step by one of the two processing units for F(A,B) comprises the obtaining by one party, of the result portion held by the other processing unit, and the inference of F(A,B) from both result portions.
the function to be evaluated is a fraction of functions, and the steps for applying and repeating the series of steps are carried out once for the numerator of the fraction, and once for the denominator.
the first operation is an addition or a multiplication, and the second operation is a multiplication or raising to a power, respectively.
the function F is a sum of the n sub-functions $f_i$, and the application of each series of steps comprises:
during step b), each element is formed by the sum of a possible result of the sub-function $f_i$ evaluated in the datum of the client and the datum of the server and of a first masking datum, and multiplied by the second masking datum,
during step d), the first party of the result is generated by the server by summing all the first masking data and by multiplying by the second masking datum, and
during step e), the second party of the result is generated by the client by summing all the intermediate data.
the function to be evaluated is one from among the following group:
the Hamming distance between the vectors of the portions,
the normalized Hamming distance between the vectors of the portions,
the scalar product between the vectors of the portions.
the vectors of the processing units are identity data of individuals, and the use of the evaluated function comprises:
comparing the value F(X,Y) with a pre-established threshold depending on the nature of the evaluated function, and
from the result of said comparison, determining (500) whether the identity data correspond or not to a same individual.
the identity data of individuals are data coded on biometric traits of individuals.
each sub-function $f_i$ is a function of two variables, the components of the data held by the processing units are integers comprised between 0 and q−1, and:
step b) comprises the generation by the server of a set comprising the elements:

$(\alpha(r_i+f_i(0,Y)),\ldots,\alpha(r_i+f_i(1,Y)))$ wherein Y is the vector held by the server, and
the recovered intermediate datum during step c) is:

$\alpha(r_i+f_i(x_i,Y))$ the function to be evaluated is a product of the n sub-functions $f_i$, and the application of each series of steps comprises:
during step b), each element is formed by the product of a possible result of the sub-function $f_i$ evaluated in the datum of the client and the datum of the server and of a first masking datum, and raising to a power of the second masking datum,
during step d), the first party of the result is generated by the server by a product of all the first masking data and raising to a power of the second masking datum, and
during step e), the second party of the result is generated by the client by a product of all the intermediate data.

each sub-function $f_i$ is a function of two variables, the components of the data held by the processing units are integers comprised between 0 and q−1, and:

step b) comprises the generation by the server of a set comprising the elements:

$$((r_i f_i(0,Y))^\alpha, \ldots, (r_i f_i(1,Y))^\alpha)$$

wherein Y is the vector held by the server, and
the recovered intermediate datum during step c) is:

$$(r_i f_i(x_i,Y))^\alpha$$

The object of the invention is also a computer program product, comprising code instructions for executing, by a processor of a processing unit, a method comprising the application of a series of steps comprising:

randomly generating n first data in the set of $\mathbb{Z}_m$ with m being a prime number, and invertible for a first operation, and a second datum belonging to the set of the invertible elements of $\mathbb{Z}_m$ for a second operation, different from the first operation and distributive relatively to the latter, for each i from 1 to n, generating a set of elements, each element being formed with:
a possible result of a function $f_i$ evaluated at an unknown datum and a known datum,
masked by a first masking datum, the masking being obtained by applying the first operation between the first datum and the result, and
masked by the second masking datum, the masking being applied by application between the result masked by the first masking datum and the second masking datum of the second operation, participating in an oblivious transfer protocol with a distinct processing unit for communicating, for each i from 1 to n, an element from among the generated elements.

According to another object, the invention proposes a method for authenticating an individual, applied by an authentication system including a first processing unit holding an identity datum of the individual, and a second processing unit holding an identity datum of a reference individual, the method comprising the application of the data processing method according to the preceding description by the processing units from two identity data, the function to be evaluated being selected from among the group comprising:
the Hamming distance between the vectors of the portions,
the normalized Hamming distance between the vectors of the portions,
the scalar product between the vectors of the portions.

The object of the invention is also a system for authenticating an individual, comprising a first processing unit and a second processing unit, each processing unit comprising a processor and a communication interface,
the system being characterized in that the first and the second processing unit are adapted for applying the data processing method according to the preceding description, the function to be evaluated being selected from the group comprising:
the Hamming distance between the vectors of the portions,
the normalized Hamming distance between the vectors of the portions,
the scalar product between the vectors of the portions.

According to an embodiment, the invention relates to a method for executing a cryptographic calculation applied by two processing units each comprising processing means, and each having a vector comprising a number n of indexed components, the method comprising a secure evaluation of a function F being written as a sum of n sub-functions $f_i$ of several variables, the evaluation being applied with the vectors of each processing unit as inputs of the function,
the method being characterized in that it comprises:
application of a series of secure calculation steps in which a processing unit assumes a role of a client and the other processing unit assumes a role of a server,
repetition of the series of secure calculation steps in which the roles of client and of server are exchanged between the two processing units,
the series of steps comprising:
a) randomly generating, by the server, n first masking data belonging to the set $\mathbb{Z}_m$ with m being a prime number and a second masking datum belonging to the set of invertible elements for the multiplication of $\mathbb{Z}_m$,
b) for each sub-function $f_i$, generating by the server, a set of elements, each element being formed by:
a possible result of the sub-function $f_i$ evaluated at the datum of the client and the datum of the server,
added with a first masking datum, and
multiplied by the second masking datum,
c) recovering by oblivious transfer, by the client, for each component of its vector, an intermediate datum corresponding to one of the elements generated by the server and indexed by the value of said component,
d) generating, by the server, a first result portion, by summing all the first masking data multiplied by the second masking datum, and
e) generating, by the client, a second result portion, by summing all the intermediate data, said second result portion comprising a masked evaluation of the function F with the vectors of two processing units as inputs,
applying, by two processing units, an equality test on the masked evaluations of the function F obtained at the end of each series of steps,
if the equality test succeeds, calculating by one of the two processing units, the function evaluated on the data of two processing units F(A,B), and
using the function evaluated on the data of two processing units in a cryptographic application.

According to a second embodiment, the invention relates to a method for executing a cryptographic calculation applied by two processing units each comprising processing means, and each having a vector comprising a number n of indexed components,
the method comprising a secure evaluation of a function F being written as a product of n sub-functions $f_i$ of several variables, the evaluation being applied with the vectors of each portion as inputs of the function,
the method being characterized in that it comprises:
application of a series of secure calculation steps in which a portion assumes a role of a client and the other portion assumes a role of a server,
repetition of the series of secure calculation steps in which the roles of client and of server are exchanged between both parties,
the series of steps comprising:
a) randomly generating, by the server, n first masking data and a second masking datum belonging to the set of invertible elements of $\mathbb{Z}_m$ with m being a prime number, b) for each sub-function $f_i$, generating by the server, a set of elements, each element being formed with:
a possible result of the sub-function $f_i$ evaluated at the datum of the client and the datum of the server, multiplied by a first masking datum, and
raising to a power the second masking datum,
c) recovering by oblivious transfer, by the client, for each component of its vector, an intermediate datum corresponding to one of the elements generated by the server and indexed by the value of said component,
d) generating, by the server, a first result portion, by multiplying all the first masking data to the power of the second masking datum, and
e) generating, by the client, a second result portion, by multiplying all the intermediate data, said second result portion comprising a masked evaluation of the function F with the vectors of two processing units as inputs,
applying by both parties an equality test on the masked evaluations of the function F obtained at the end of each series of steps,
if the equality test succeeds, calculating by one of the two portions, the function evaluated in the data of both parties F(A,B), and
using the function evaluated on the data of two processing units in a cryptographic application.

The proposed method is secure even in the case when the parties in the calculation, i.e. the processing units, are malicious, by assuming that the oblivious transfer protocol is itself secure.

Indeed, first the fact of proposing a double execution of the series of steps of the calculation of the function, by reverting the roles between both parties, gives the possibility that each party obtains a portion of the result. The equality test then allows comparison of whether both results are identical without revealing their values in order to be able to stop the protocol without revealing the output in the case of cheating.

Secondly, the method gives the possibility of guarding against a case when a malicious party would distort the result of the equality test or the result of the function F(X,Y) by modifying the values of the result portions T and R obtained at the end of a series of steps. Indeed, the method comprises dual masking which comprises the random generation by each party of an reversible datum which protects these values of T and R. It is thus much more difficult, for a malicious party, to distort the equality test of F(X,Y) since it is not aware of the value of the reversible datum of the other party and therefore cannot adapt its values of T, R, or of its second masking datum for deceiving the equality test.

As both series of steps may be executed in parallel, this method only requires a very limited increase in the execution time as compared with the version of the non-secure method against malicious parties.

The application of the method shown to functions of the Hamming distance types, or a scalar product, on the identity data of individuals such as biometric data, allows secure authentication of individuals.

DESCRIPTION OF THE FIGURES

Other features, objects and advantages of the present invention will become apparent upon reading the detailed description which follows, with reference to the appended figures, given as non-limiting examples and wherein.

DETAILED DESCRIPTION OF AT LEAST ONE EMBODIMENT OF THE INVENTION

Data Processing System

Figure 4:
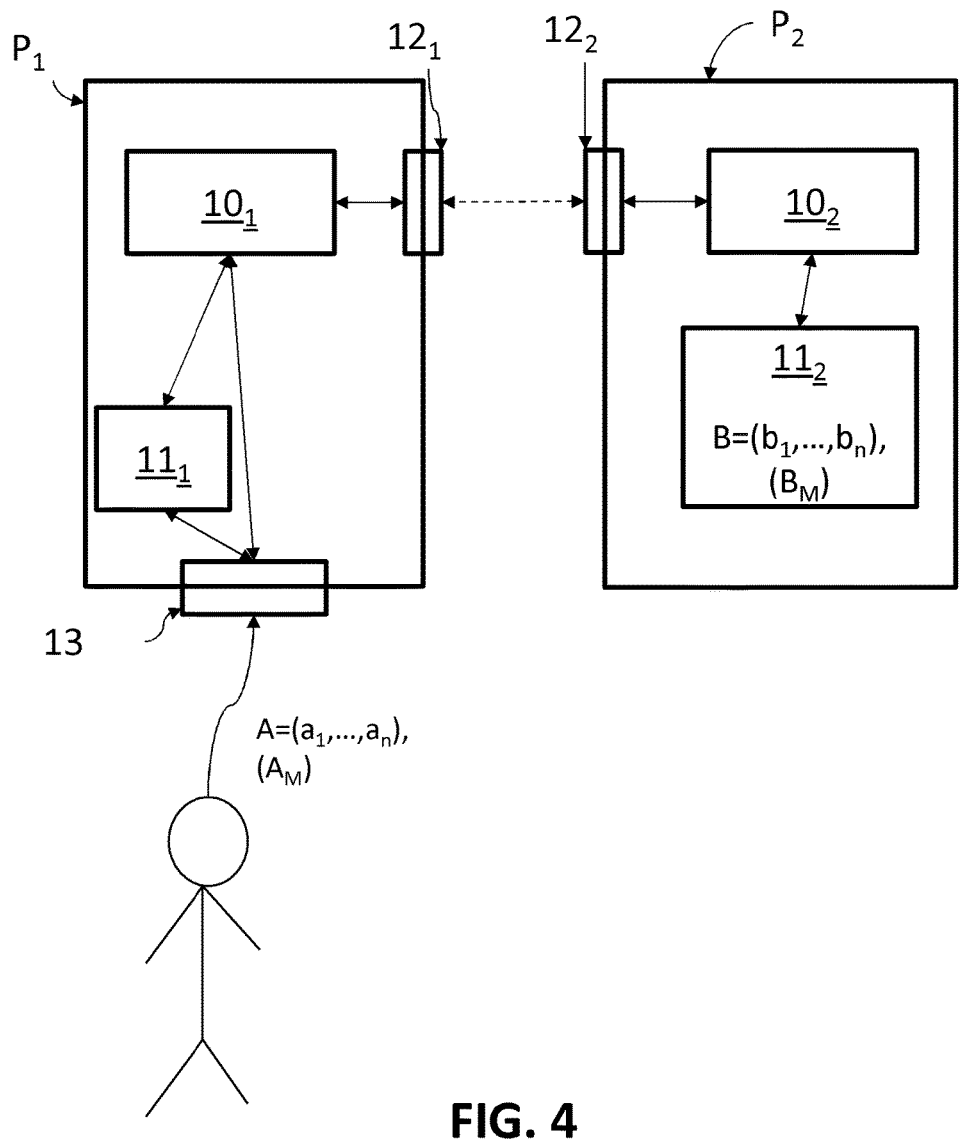

With reference to FIG. 4, two portions $P_1$ and $P_2$ respectively having a vector A and B, is illustrated, each vector comprising a same number n of indexed components $(a_1, \ldots, a_n)$, $(b_1, \ldots, b_n)$.

Each vector is expressed in a base q, wherein q is an integer strictly greater than 1, i.e. the components $a_i$ and $b_i$ are integers with values comprised between 0 and q-1. The data A and B are not necessarily expressed in the same base so that A may be in a base q and B in a base q' with q' being an integer strictly greater than 1 and different from q.

According to a particular and non-limiting embodiment, each vector is binary, and its components are with values equal to 0 or 1.

The vectors A and B respectively held by the portions $P_1$ and $P_2$ are secrets, i.e. the vector A is only known to $P_1$ and the vector B is only known to $P_2$.

Each party is a processing unit, and has processing means, for example a processor $10_1$, $10_2$, adapted for applying the calculations, and for executing a program comprising code instructions installed on the processor. Each party also has a memory $11_1$, $11_2$ and an interface $12_1$, $12_2$ for communication with the other party.

Both parties $P_1$ and $P_2$ may be engaged into a method for executing a cryptographic calculation comprising the calculation of a function F which is obtained by applying to a set of n sub-functions $f_i$ of a same mathematical operation, called first operation, wherein the sub-functions $f_i$ are with several variables, n is a positive integer corresponding to the number of sub-functions in the function f, and i is a mute index with values from 1 to n.

It may be noted that $F=f_1 op f_2 op \ldots op f_n$, wherein op is the first operation.

The first operation is for example a sum or a product, i.e. the function F is respectively written either as a sum, or as a product, of n sub-functions $f_i$. In particular, each sub-function $f_i$ is a function of two variables X and Y with n components $x_i$, $y_i$.

In the case when F is written as a sum of sub-functions $f_i$, it is noted that:

$$F(X, Y) = \sum_{i=1}^{n} f_i(x_i, Y) = \sum_{i=1}^{n} f_i(y_i, X)$$

with $x_i$, $y_i$, being the integer components of the variables X and Y.

In the case when F is written as a product of sub-functions $f_i$, it is noted that:

$$F(X, Y) = \prod_{i=1}^{n} f_i(x_i, Y) = \prod_{i=1}^{n} f_i(y_i, X)$$

with $x_i$, $y_i$, being the integer components of the variables X and Y.

The sub-functions of $x_i$, Y and of $y_i$, X may be different so as to be able to have an expression of F such that:

$$F(X, Y) = \prod_{i=1}^{n} f_i(x_i, Y) = \prod_{i=1}^{n} g_i(y_i, X)$$

Also, the number of components of $x_i$ and $y_i$, and therefore of sub-functions $f_i$ and $g_i$ may be two different numbers. The method applies in this case in the same way by means of a taking into account of the differences of sub-functions and the number of components.

However, subsequently, the simplified case when the sub-functions are identical, will be assumed, and the numbers of components of the data are also identical.

The function F may also be a fraction for which the numerator and the denominator are each obtained by applying the first operation with n sub-functions. In this case, and as this is seen hereafter, the method is applied twice, once for calculating the numerator, and once for calculating the denominator.

The function F is with values in the set $\mathbb{Z}_m$ of the integers comprised between 0 and m−1, wherein m is a positive integer, and is further prime, for the reasons explained hereafter. Further, the function F is with values in the sub-set of $\mathbb{Z}_m$ of the invertible elements for the first operation.

This means that, in the case when the function F is written as a product of n sub-functions $f_i$, this function has values in the set $\mathbb{Z}_m^*$ of the integers comprised between 1 and m−1, with m also being a prime number. In other words, the $f_i(x_i, Y)$ and the $f_i(y_i, X)$ are advantageously all different from 0. This gives the possibility of improving the safety of the method for the reasons detailed hereafter.

The data processing method which will be described hereafter may notably be applied to a context of authentication of individuals, notably biometric authentication, when the function F is written as a sum of the sub-functions $f_i$. The authentication system of FIG. 4 is illustrated in such a context and as a non-limiting example.

An authentication method comprises a comparison of an identity datum of a candidate individual with a datum of a reference individual for detecting matching between the data and detecting that the individual is the reference individual.

In this context, a party $P_1$ may be a control unit of a candidate individual, for example comprising a means 13 for acquiring an identity datum of the individual. This identity datum is advantageously a biometric datum, i.e. a digital datum coded on a biometric trait of an individual.
The relevant biometric traits may typically comprise fingerprints, iris images, shape of the face, etc.

In this case, the means for acquiring an identity datum of the control server is advantageously a biometric datum sensor (for example, but not in a limiting way, a fingerprint sensor) or an identity document reader in which a biometric datum has been recorded beforehand, for example by being stored in memory in an electronic chip integrated to the document or printed on the document.

The other party $P_2$ may be a unit comprising at least one identity datum of a reference individual, for example stored in its memory $11_2$.

The function F may then be a function for comparing identity data of individuals, and in particular may be selected from the following group:

Hamming distance, defined by $F(X, Y) = \sum_{i=1}^{n} x_i \oplus y_i$, normalized Hamming distance, defined by $$F(X, Y) = \frac{\sum_{i=1}^{n}(m_i m_i'(x_i \oplus y_i))}{\sum_{i=1}^{n}(m_i m_i')},$$

wherein $M = (m_1, \ldots m_n)$ and $M'(m'_1, \ldots, m'_n)$ are masking vectors respectively associated with the vectors X and Y, the bits of which equal to 1 indicate the bits of the same index of the vectors X and Y to be taken into account for calculating the Hamming distance, and the scalar product, defined by $F(X, Y) = \sum_{i=1}^{n} x_i y_i$.

During a method for authenticating an individual, the portions $P_1$ and $P_2$ are engaged into the calculation of the function F selected from among this group by following the method described hereafter for evaluating a similarity level between an identity datum of the individual and an identity datum of the reference individual.

If the similarity level is less than a predetermined threshold, the identity data of the candidate individual and of the reference individual are considered as stemming from the same person and the candidate individual is authenticated.

Data Processing Method

With reference to FIGS. 1a to 3α, a method for calculating the function F will be described, which may be applied by a system as shown hereinbefore, and which only allows one of the portions to obtain the evaluation of the function F(A,B) with as inputs, the vectors A and B held by the parties, without any party obtaining information on the vector of the other party, even if it has a malicious behavior.

Figure 1A:
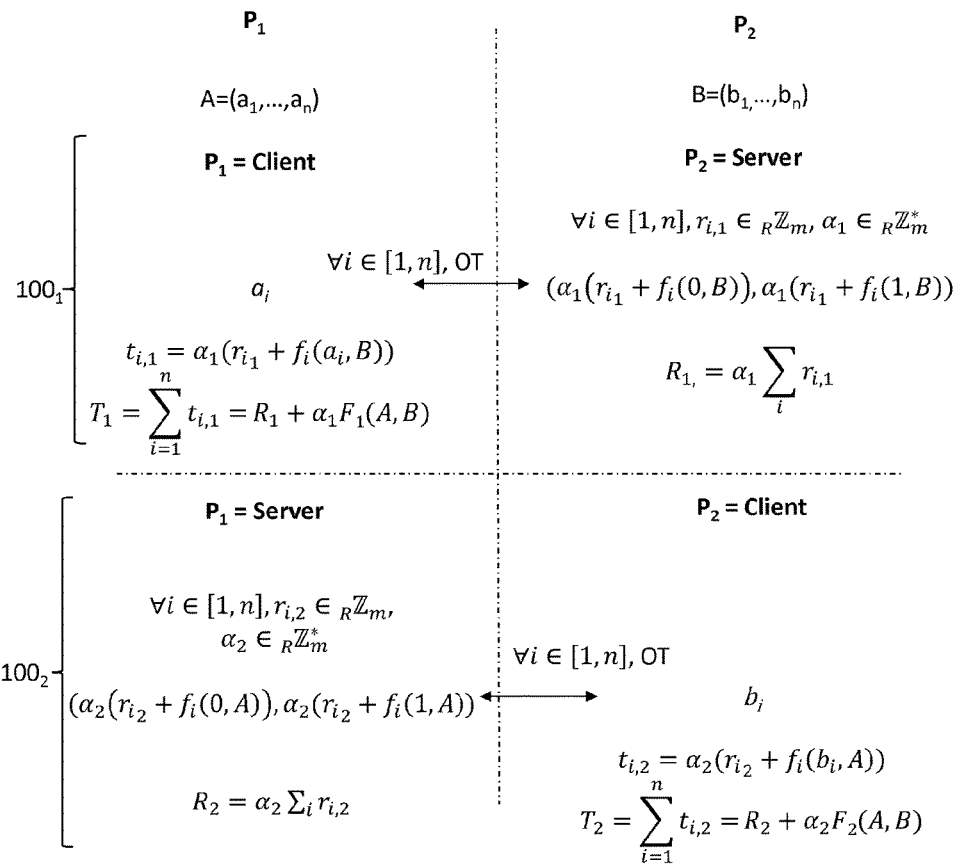
FIG. 1a illustrates a first exemplary embodiment for executing a series of steps of a method for executing a cryptographic calculation.
Figure 1B:
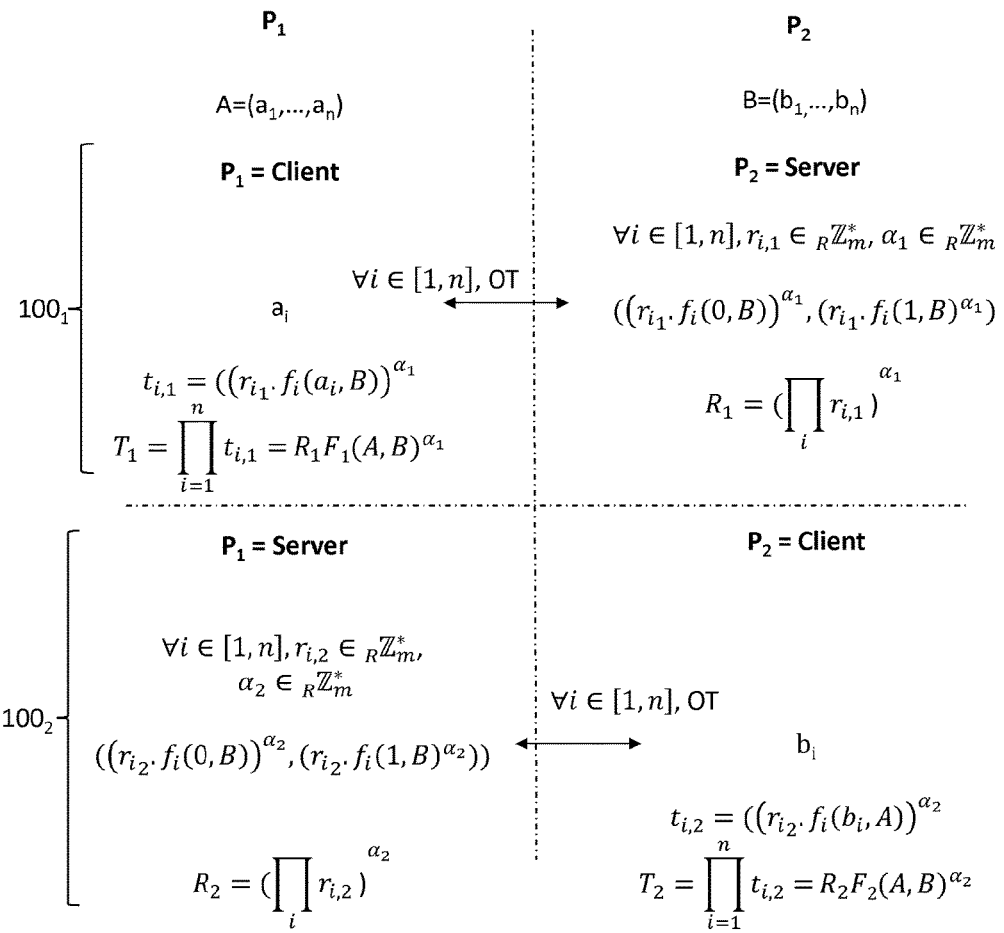
FIG. 1b illustrates a second exemplary repeated embodiment for a series of steps of a method for executing a cryptographic calculation with different masking data.

To do this, the method comprises a first phase 100, illustrated in FIGS. 1a and 1b, comprising the application of a series of determined steps $100_1$ in which the first party $P_1$ has a role of a client and the second party $P_2$ a role of a server, and the repetition of this series of steps $100_2$ by reverting the roles, i.e. the first party $P_1$ has a role of a server and the second party $P_2$ has a role of a client.

Preferably, but not in a limiting way, the application of both series of steps may be achieved simultaneously by the two parties, this in order to shorten the execution period of the method. Alternatively, the series of steps may be applied in succession.

First Phase of the Method

Subsequently, and for the purpose of conciseness, the series of steps will be described relatively to the roles of the server and of the client without detailing the first phase and then the second phase, since they are symmetrical.

The vector held by the party having the role of a client is noted as X and the vector held by the party having the role of a server as Y. It is therefore understood that during the application of the first series of steps $100_1$, X=A and Y=B, and during the application of the second series of steps $100_2$, X=B and Y=A. It is also noted with the indexes 1 and 2, that the applied steps or the data are respectively generated during the first or second series of steps.

The implementation of each series of steps with the notations specific to each party and each application of the series of steps is nevertheless detailed in FIGS. 1a and 1b.

Each series of steps $100_1$, $100_2$ includes a first step $110_1$, $110_2$ during which the server randomly generates a set of n first masking data indexed as $r_i$ in the set $\mathbb{Z}_m$. The data $r_i$ are further selected from among the invertible elements in the set $\mathbb{Z}_m$, for the first operation.

In other words, if F is a sum of the sub-functions $f_i$, the data $r_i$ are then invertible for addition, and they are therefore selected from the set $\mathbb{Z}_m$.

It is noted that:

$$\forall i \in [1,n], r_i \in_R \mathbb{Z}_m$$

On the other hand, if the function F is a product of the sub-functions $f_i$, then the data $r_i$ are invertible for multiplication, and they are therefore selected from the set $\mathbb{Z}_m^*$ (i.e. $\mathbb{Z}_m$ without the element 0).

It is noted that:

$$\forall i \in [1,n], r_i \in_R \mathbb{Z}_m^*$$

The server also randomly generates a second masking datum α invertible for a second operation, which is different from the first and distributed relatively to the latter. For example, if the first operation is addition, F is a sum of $f_i$, and the second operation is advantageously multiplication. If the first operation is multiplication, F is a product of $f_i$, the second operation is advantageously raising to a power.

In both of these examples, the second masking datum α should be invertible for multiplication in the set $\mathbb{Z}_m$ (since the same inversion criteria apply for multiplication and for raising to a power). It is noted that $\alpha \in_R \mathbb{Z}_m^*$.

In FIGS. 1a and 1b, the index 1 or 2 has further been added to the data $r_i$ and a for indicating that these data are respectively generated during the first or the second application of the series of steps 100 and are therefore not identical (for example $\alpha_1 \neq \alpha_2$ and for each i from 1 to n, $r_{i1} \neq r_{i2}$). The indexes 1 and 2 are nevertheless omitted in most of the notations hereafter in order not to burden the text.

The fact that m is a prime number implies that all the elements of the set $\mathbb{Z}_m^*$ are invertible for multiplication. Therefore, when the second datum α is randomly selected, no information may be inferred therefrom on the value of this datum.

As this has been said, in the case of a function F in the form of a fraction of functions, like this is the case, for example, of the normalized Hamming distance (a case not illustrated in FIG. 1a), then at each implementation of step 100, data $r_i$ and a are generated for the numerator, and data $r'_i$ and α' (having the same properties as the data $r_i$ and a) for the denominator.

During a step $120_1$, $120_2$, the server generates from these data and for each sub-function $f_i$, i.e. for any i from 1 to n, a set of elements, such that each element is formed by a possible result of the function $f_i$ evaluated at the datum of the client (which is therefore unknown to it) and the datum of the server $f_i(x_i, Y)$, masked by a first masking datum $r_i$ and by the second masking datum α.

The masking by the first masking datum $r_i$ is applied by applying between this datum and the possible result of the function $f_i$ the first operation, i.e. for example summation or multiplication, if F is respectively obtained by summation or multiplication of the sub-functions $f_i$.

In the case when F is a sum of $f_i$, each possible result of the function $f_i$ evaluated at the datum of the client and the datum of the server is added with a first masking datum $r_i$.

In the case when F is a product of $f_i$, each possible result of the function $f_i$ evaluated at the datum of the client and the datum of the server is multiplied by a first masking datum $r_i$.

The masking with the second masking datum α is applied by applying, between the result of the function $f_i$ masked by a first masking datum $r_i$ and the second masking datum α, the second operation.

In particular, in the case when the first operation is a summation, each element of the set generated by the server is a possible result of the function $f_i$ evaluated at the datum of the client and the datum of the server, added with a first masking datum $r_i$, and multiplied by the second masking datum α:

$$\alpha(r + f_i(x_i, Y))$$

For example, if the function is a sum of sub-functions $f_i$ with two variables and if the data X and Y are binary, the server therefore generates a doublet as follows:

$$(\alpha(r_i + f_i(0, Y)), \alpha(r_i + f_i(1, Y)))$$

In the case when the first operation is a multiplication, the second operation is raising to the power of the second masking datum α.

Then, each element of the set generated by the server is a possible result of the function $f_i$ evaluated in the datum of the client and the datum of the server, multiplied by a first masking datum $\tau_i$, and raised to the power α:

$$(r_i f_i(x_i, Y))^\alpha$$

For example, when the function is a product of sub-functions $f_i$ with two variables, and when the data X and Y are binary, the server generates a doublet as follows:

$$((r_i f_i(0, Y))^\alpha, (r_i f_i(1, Y))^\alpha)$$

When the function F is a fraction, a set compliant with the preceding description is generated by the server for the numerator, and another one for the denominator.

According to a particular example, in the case when the function to be evaluated is the normalized Hamming distance, each portion has, in addition to its respective binary datum A, B, a respective masking datum of size n, also binary, and for which the bits set to 1 respectively indicate the bits of the vectors A and B to be taken into account for the calculation of the Hamming distance. The masking datum held by the unit having the role of a server is noted as $M = (m_1, \ldots m_n)$ and the masking datum held by the unit having the role of a client is noted as $M' = (m'_1, \ldots m'_n)$.

In FIG. 4, the masking data respectively corresponding to the vectors A and B are indicated by $A_M$ and $B_M$. Therefore, during the first application of the series of steps $100_1$, $A_M = M'$ and $B_M = M$, and during the second application of the series of steps $100_2$, $A_M = M$ and $B_M = M'$.

In this case, for each portion, it is possible to reduce it to a datum of length 2n by considering that a bit of the datum associated with a corresponding bit of the mask set to 0 is zero.

Thus a datum obtained from X and M' with a length of 2n is thus posed as X' and such that $x'_i = x_i$ for i=1 to n and $x'_i = m'_{i-n}$ for i comprised between n+1 and 2n. The same thing applies mutatis mutandis in order to obtain Y' from Y and M.

During step 120, the server generates, as regards the numerator, for all the from 1 to 2n, a set of doublets:

$$(\alpha(r_i + f_i^{num}(0, Y)), \alpha(r_i + f_i^{num}(1, Y)))$$

Wherein $f_i^{num}$ designates the numerator of the normalized Hamming distance, for which the values are detailed in paragraph 4.2 of the publication of J. Bringer et al., "GSHADE: Faster Privacy-Preserving Distance Computation and Biometric Identification", in *Proceedings of the 2nd ACM workshop on Information hiding and multipedia security*, 187-198, 2014.

The server also generates, for the denominator, for all the i from 1 to n, a set of doublets:

$$(\alpha' r'_i, \alpha'(r'_i + m_i)).$$

During step 120, the server thus generates a combination of the possible results of the function F evaluated in the datum of the server and of the client, by masking the results with the $r_i$ and $\alpha_i$ (and if necessary $r'_i$ and $\alpha'_i$).

The series of steps then comprises a step 130₁, 130₂ during which the client and the server engage into an oblivious transfer protocol, wherein the client recovers, for each i from 1 to n, one of the elements of the set generated by the server in step 120, indexed with the value of $x_i$. The oblivious transfer type which is used for this step is preferably a protocol which is secure against malicious parties. This is the case of the oblivious transfer protocols which are described in both of these publications:

Asharov et al., *More efficient oblivious transfer and extensions for faster secure computation*, In 2013 *ACM SIGSAC Conference on Computer and Communications Security, CCS '13*, Berlin, Germany, Nov. 4-8 2013, pages 535-548, 2013.

Asharov et al., *More efficient oblivious transfer extensions with security for malicious adversaries*. In *Advances in Cryptology—EUROCRYPT 2015-34th Annual International Conference on the Theory and Applications of Cryptographic Techniques*, Sofia, Bulgaria, Apr. 26-30 2015, *Proceedings, Part I*, pages 673-701, 2015

The oblivious transfer is schematized in FIGS. 1a and 1b with the acronym "OT".

In particular, in the case when the server has generated a doublet for each i, if $x_i$ is equal to 0, the client recovers by an oblivious transfer of type 1 from among 2 the first element of the doublet, and if $x_i$ is equal to 1, it recovers the second element of the doublet.

In a more general case when the datum of the client is expressed in base q, the server will have generated a q-uplet for each i, and the client recovers by an oblivious transfer of type 1 from q the element of the doublet corresponding to the value of $x_i$ between 0 and q−1.

Thus, the client may recover a datum $t_i$ called an intermediate datum.

The intermediate datum $t_i$ is written as, in the case when the function F is a sum of sub-functions $f_i$:

$$t_i = \alpha(r_i + f(x_i, Y))$$

In the case when the function F is a product of sub-functions $f_i$, it is written as:

$$t_i = (r_i \cdot f_i(x_i, Y))^\alpha$$

In the example introduced earlier when the function F is the normalized Hamming distance, the client recovers an intermediate datum $t_i$ for the numerator, depending on the value of $x'_i$ as defined hereinbefore, and an intermediate datum $t'_i$ for the denominator, depending on the value of $m'_i$.

In FIGS. 1a and 1b, an index 1 or 2 has also been added to the intermediate data $t_i$ depending on whether they are obtained during the first or the second implementation of the phase 100.

During a step 140₁, 140₂, the server generates from all the first masking data $r_i$ and from the second masking datum $\alpha$ a first result portion noted as R.

This portion R is obtained by applying the first operation—i.e. for example addition or multiplication—to all the first masking data, and by masking them with the second datum $\alpha$, i.e. by applying to them the second operation with $\alpha$, for example respectively by multiplying them by $\alpha$ or by raising them to the power $\alpha$.

As a summary, in the case when the function F is a sum of the sub-functions $f_i$, the server generates a result portion R such that:

$$R = \alpha \sum_i r_i$$

In the case when the function F is a product of sub-functions $f_i$, the server generates a result portion R such that:

$$R = \left( \prod_{i=1}^n r_i \right)^\alpha$$

In the case of the calculation of a function as a fraction, the server carries out this operation for the numerator from the data $r_i$ and $\alpha$ in order to obtain a datum R and for the denominator from the data $r'_i$ and $\alpha'$ in order to obtain a datum R'.

The step 140 may be applied at any moment after step 110, but not necessarily after step 130.

Of course, and as visible in FIGS. 1a and 1b, a result portion R (and if required R') is calculated during each implementation of the phase 100. The result portion calculated during the first implementation of the phase 100 is noted as $R_1$ and the result portion calculated during the second implementation of the phase 100 is noted as $R_2$. $R_1$ and $R_2$ are different.

During a step 150₁, 150₂, the client applies the first operation—i.e. for example addition or multiplication—to all the intermediate data $t_i$ so as to obtain a result portion T such that:

If the function F is a sum of sub-functions $f_i$:

$$T = \sum_{i=1}^n t_i = \sum_{i=1}^n \alpha(r_i + f_i(x_i, Y)) = R + \alpha F(X, Y)$$

If the function F is a product of sub-functions $f_i$:

$$T = \prod_{i=1}^n t_i = \prod_{i=1}^n (r_i \cdot f_i(x_i, Y))^\alpha = R \cdot F(X, Y)^\alpha$$

As earlier, a result portion T is calculated during each implementation of the phase 100, and in FIGS. 1a and 1b, the result portions respectively obtained during the first and the second implementation, are noted as $T_1$ and $T_2$ respectively, $T_1$ and $T_2$ being different.

In the case when the function f is a fraction, this step is applied for the numerator (obtaining a datum T) and for the denominator (obtaining a datum T') with the respective intermediate data.

By again taking the indexes 1 and 2 related to the first or second implementation of the phase 100, at the end of the first application of the series of steps, the party $P_1$ in the role of the client has a datum $T_1$ and the party $P_2$ in the role of the server has a datum $R_1$ giving the possibility of obtaining together a first evaluation of the function F in the data of the client and of the server, masked by the second masking datum $\alpha_1$, which was randomly generated by the party $P_2$ as a server, and is therefore unknown to the party $P_1$.

In the case when F is a sum of sub-functions, one has $$T_1 - R_1 = \alpha_1 F_1(X,Y)$$

In the case when F is a product of sub-functions, one has $$T_1 \cdot R_1^{-1} = F_1(X,Y)^{\alpha_1}$$

At the end of the second application of the series of steps $100_2$, the party $P_1$ in the role of the server has a datum $R_2$, and the party $P_2$ in the role of the client has a datum $T_2$ giving the possibility of obtaining a second evaluation of the function F in the data of the client and of the server, masked by the second masking datum $\alpha_2$, which was randomly generated by the party $P_1$ as a server, and is therefore unknown to the party $P_2$.

In the case when F is a sum of sub-functions, one has:

$$T_2 - R_2 = \alpha_2 F_2(X,Y)$$

In the case when F is a product of sub-functions, one has:

$$T_2 \cdot R_2^{-1} = F_2(X,Y)^{\alpha_2}$$

The results $F_1(X,Y)$ and $F_2(X,Y)$ are equal and have the value $F(A,B)$ in the absence of any fraud.

In the case when one of the parties is malicious, for example $P_1$, it therefore cannot, by modifying the values of the data which it holds, for example $T_1$, $R_2$ and $\alpha_2$, ensure that:

$$\alpha_2(T_1 - R_1) = \alpha_2 \alpha_1 F_1(X,Y) = \alpha_1(T_2 - R_2) = \alpha_1 \alpha_2 F_2(X,Y)$$

or that:

$$(T_1 \cdot R_1^{-1})^{\alpha_2} = F_1(X,Y)^{\alpha_1 \alpha_2} = (T_2 \cdot R_2^{-1})^{\alpha_1} = F_2(X,Y)^{\alpha_2 \alpha_1}$$

Returning to step 150, for the case of the generalized Hamming distance, the client separately sums the intermediate data $t_i$ and $t'_i$ obtained for the numerator and the denominator, in order to obtain (indexes 1 and 2 are omitted):

$$T = \sum_{i=1}^{n} t_i = R + \alpha \|(X \oplus Y) \cap M \cap M'\|$$

$$T' = \sum_{i=1}^{n} t'_i = R' + \alpha' \|M \cap M'\|$$

Therefore, subsequently to both implementations of the phase 100, the following relationships are obtained:

$$\alpha_1(\alpha'_1)^{-1} F_1(X,Y) = \frac{T_1 - R_1}{T'_1 - R'_1}$$

$$\alpha_2(\alpha'_2)^{-1} F_2(X,Y) = \frac{T_2 - R_2}{T'_2 - R'_2}$$

As earlier, by means of the multiplication during each series of steps by a value $\alpha_1$, $\alpha'_1$, $\alpha_2$ or $\alpha'_2$ which is random and specific to a party, a malicious party, for example $P_1$ cannot modify the elements which it holds, i.e. $T_1$, $T'_1$, $R_2$, $R'_2$ and $\alpha_2$ and $\alpha'_2$, in order to ensure that:

$$\alpha_1(\alpha'_1)^{-1} \alpha_2(\alpha'_2)^{-1} F_2(X,Y) =$$
$$\frac{\alpha_1}{\alpha'_1} \frac{T_2 - R_2}{T'_2 - R'_2} = \alpha_1(\alpha'_1)^{-1} \alpha_2(\alpha'_2)^{-1} F_1(X,Y) = \frac{\alpha_2}{\alpha'_2} \frac{T_1 - R_1}{T'_1 - R'_1}$$

Equality Test

At the end of the phase 100, the method comprises an equality test 200 for the values of $F_1(X,Y)$ and $F_2(X,Y)$ which may be inferred from each series of steps of the phase 100. In order that this equality test 200 does not reveal any information on the value of F (X,Y) before having verified the equality, it comprises the two following steps:

A first step 210 consists of "pledging" or achieving a "commitment" of the whole of the outputs of both series of steps of the phase 100, i.e. $T_1$, $R_1$, $\alpha_1$, and $T_2$, $R_2$, $\alpha_2$.

Pledging is a conventional operation in cryptography consisting of generating from a datum, a ciphering function and a key, a value not providing any information on the initial datum. Further, it guarantees that during the "decommitment" operation, which consists of finding again the initial datum from the value of the key and from a suitable deciphering function, the initial datum obtained at the end of the decommitment has not been altered. Step 210 therefore gives the possibility of ensuring that during the equality test, no output of the series of steps of phase 100 is altered.

A second step 220 is a verification of the equality of the values of $F_1(X,Y)$ and $F_2(X,Y)$ without a party obtaining any information on the result $F(X,Y)$.

As a non-limiting example, an equality test protocol possible for this phase 200 is described hereafter and with reference to FIG. 2.

During this protocol, the party $P_1$ has as inputs, the data $T_1$, $R_2$ and $\alpha_2$ and the party $P_2$ has as inputs, the data $R_1$, $T_2$ and $\alpha_1$ stemming from the first phase 100.

The protocol comprises a first pledging step 210 during which the party $P_1$ pledges, by means of random keys $K_1$, $K_2$, $K_3$ its data $T_1$, $R_2$ and $\alpha_2$ respectively in order to obtain three tokens $c_1$, $c_2$, $c_3$ respectively defined by:

$$c_1 = Com(T_1, K_1)$$

$$c_2 = Com(R_2, K_2)$$

$$c_3 = Com(\alpha_2, K_3)$$

The party $P_1$ sends the tokens to the party $P_2$. In the case when the calculated function is the generalized Hamming distance, the data $T'_1$, $R'_2$ and $\alpha'_2$ are pledged with other random keys, and the obtained tokens are also send to the other portion.

On its side, the party $P_2$ pledges, by means of random keys $K_4$, $K_5$, $K_6$, its data $R_1$, $T_2$ and $\alpha_1$ respectively in order to obtain three tokens $c_4$, $c_5$, $c_6$ respectively defined by:

$$c_4 = Com(R_1, K_4)$$

$$c_5 = Com(T_2, K_5)$$

$$c_6 = Com(\alpha_1, K_6)$$

The party $P_2$ sends the tokens to the party $P_1$. In the case when the calculated function is the generalized Hamming distance, the data $T'_2$, $R'_1$ and $\alpha'_1$ are pledged with other random keys, and the obtained tokens are also send to the first party $P_1$.

The step 220 for verifying the equality of the values of $F_1(X,Y)$ and $F_2(X,Y)$ obtained during the phase 1 may then be applied as follows, according to a non-limiting example.

The first party $P_1$ sends to the second party $P_2$, the datum $R_2$ and the key $K_2$. The party $P_2$ may therefore achieve decommitment of the $R_2$ datum, $Decom(c_2, K_2)$, and verify that it corresponds to the transmitted datum, and therefore that the party $P_1$ has not been modified. If there exists a difference between the datum $R_2$ transmitted by $P_1$ and its decommitment from $K_2$, the protocol stops, a fraud is detected.

Next, the second party $P_2$ sends to the first party $P_1$ the datum $R_1$ and the key $K_4$. The party $P_1$ may achieve decommitment of the datum $R_1$, $Decom(c_4, K_4)$, and verify that it corresponds to the transmitted datum. If there exists a difference between the datum $R_1$ transmitted by $P_2$ and its decommitment from $K_4$, the protocol stops, a fraud is detected.

In the case of a function F in the form of a fraction of functions, the verification of equality is achieved by separately verifying the equality of the numerators and of the denominators.

Figure 2A:
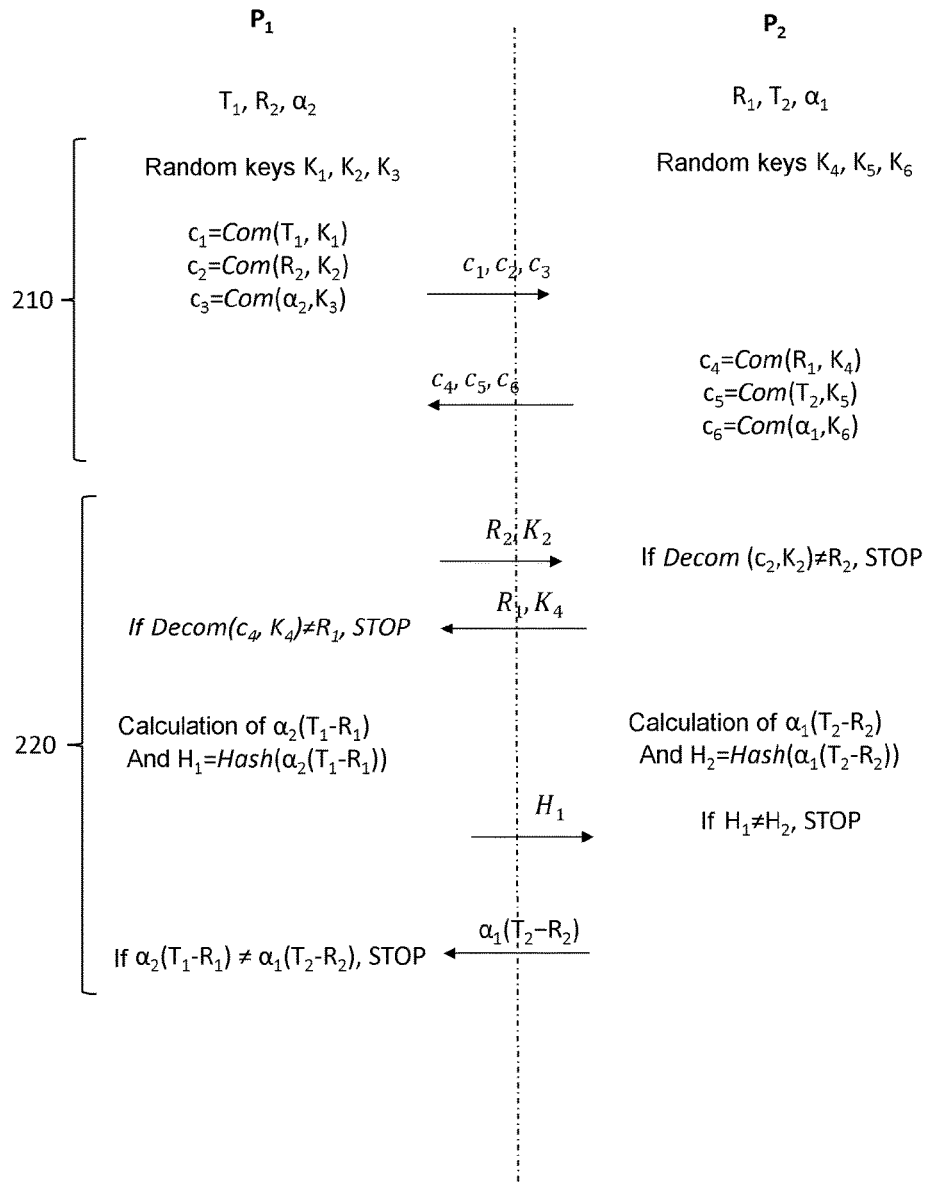
FIG. 2a illustrates an exemplary equality test which may be applied to the exemplary embodiment of FIG. 1a, FIG. 2b illustrates an exemplary equality test which may be applied to the exemplary embodiment of FIG. 1b, FIG. 3a schematically illustrates the main steps of an exemplary method for executing a cryptographic calculation, FIG. 3b schematically illustrates the main steps of an exemplary authentication method, FIG. 4 schematically illustrates one of the data processing systems adapted for applying the method, in an exemplary application to authentication of an individual.

In FIG. 2a, in the case when the function F is a sum of sub-functions $f_i$, the party $P_1$ and the party $P_2$ are then able to respectively calculate the values $\alpha_1\alpha_2 F_1(X, Y)$ and $\alpha_1\alpha_2 F_2(X, Y)$ (through $\alpha_2(T_1-R_1)$ and $\alpha_1(T_2-R_2)$).

The following notations are used $H_1=Hash(\alpha_1\alpha_2 F_1(X, Y))$ and $H_2=Hash(\alpha_1\alpha_2 F_2(X, Y))$ wherein Hash is a hash function.

A portion first sends one of $H_1$ or $H_2$ to the other portion, which compares one of the received $H_1$ or $H_2$ with the other one which it held previously. If H1≠H2, the portion having carried out the comparison stops the protocol. Otherwise, as this portion only has hashed data, it cannot infer therefrom the value of the function F evaluated in X and Y.

Then this portion sends the one which it holds from $\alpha_1\alpha_2 F_2(X,Y)$ and $\alpha_1\alpha_2 F(X, Y)$ to the other portion. The portion having for example received $\alpha_1\alpha_2 F_2(X, Y)$ compares it with $\alpha_1\alpha_2 F(X, Y)$ which it already held (or vice-versa) in order to check equality between both terms. If this is not the case, the portion stops the protocol.

Otherwise, both parties were able to verify whether $F_1(X,Y)=F_2(X,Y)$ while ensuring that the portion has not altered the integrity of the data.

Figure 2B:
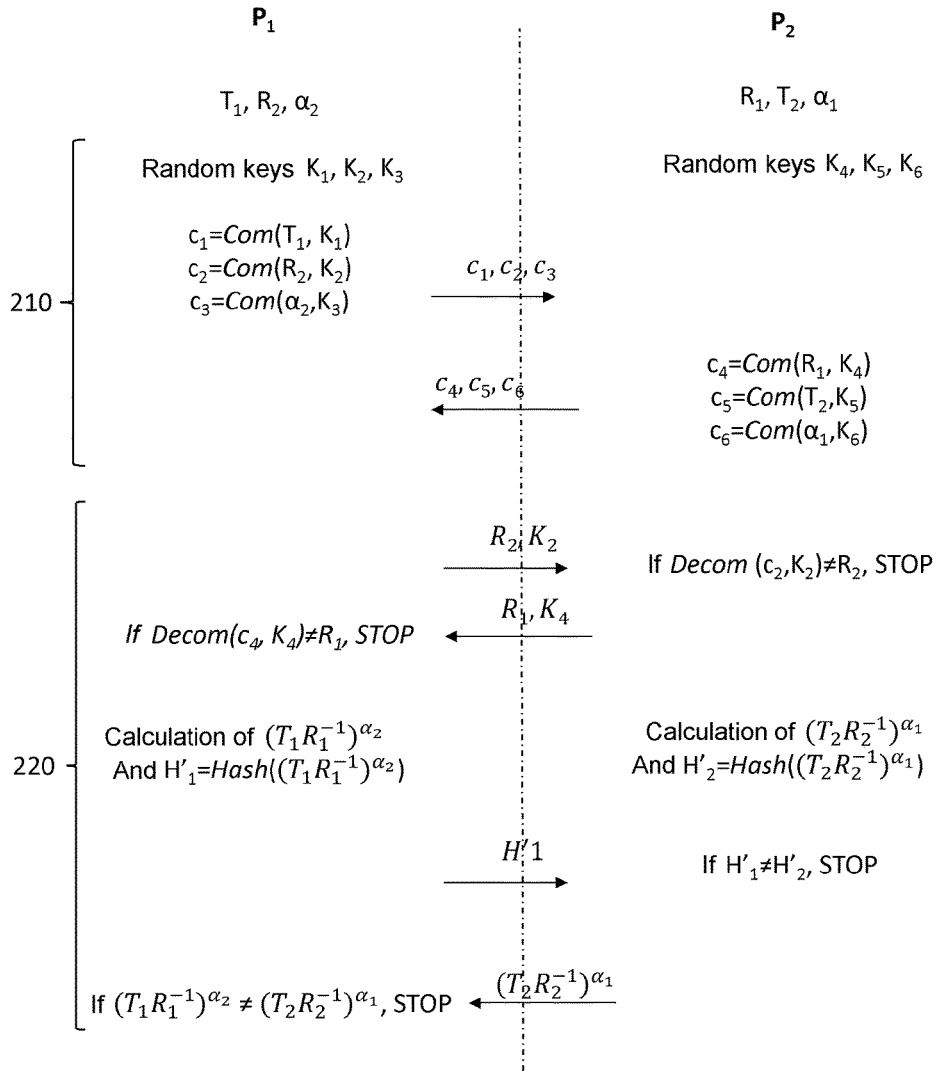

In FIG. 2b, in the case when the function F is a product of sub-functions $f_i$, the party $P_1$ and the party $P_2$ are able to calculate $(F_1(X,Y))^{\alpha_1\alpha_2}$ and $(F_2(X,Y))^{\alpha_1\alpha_2}$ (through $(T_1 R_1^{-1})^{\alpha_2}$ and $(T_2 R_2^{-1})^{\alpha_1}$)

The following notations are used $H'_1=Hash((F_1(X,Y))^{\alpha_1\alpha_2})$ and $H'_2=Hash((F_2(X, y))^{\alpha_1\alpha_2})$ wherein Hash is a hash function.

A portion sends one of $H'_1$ or $H'_2$ to the other portion, which compares $H'_1$ and $H'_2$, and stops the protocol if a difference exists.

Otherwise, it then sends to the other portion one of $(F_2(X,Y))^{\alpha_1\alpha_2}$ and $(F_1(X, y))^{\alpha_1\alpha_2}$.

The portion having $(F_2(X,Y))^{\alpha_1\alpha_2}$ and $(F_1(X,Y))^{\alpha_1\alpha_2}$ compares them, and if there is a difference, it stops the protocol. Thus, both parties may check whether $F_1(X,Y)=F_2(X,Y)$ while guaranteeing the integrity of the data.

If a portion ascertains that $F_1(X,Y)\neq F_2(X,Y)$, then the protocol stops and a fraud is detected.

At the end of the equality test, if the equality of the values of $F_1(X,Y)$ and $F_2(X,Y)$ was verified and confirmed, then one of the two portions may calculate $F(X,Y)$ during a step 300.

For example, a portion may either use its datum $T_i$ ($T_2$ respectively) and recover $R_1$ ($R_2$ respectively) and $\alpha_1$ ($\alpha_2$ respectively) from the other portion, or use its data $R_1$ ($R_2$ respectively) and $\alpha_1$ ($\alpha_2$ respectively) and recover the datum $T_1$ ($T_2$ respectively) held by the other portion, in order to infer $F(A,B)$ therefrom.

According to an advantageous alternative in terms of safety, the portion may use a datum of the other portion which it has already received during the method (in this case, $R_1$ or $R_2$), and also use the two other parameters $T_1$, $\alpha_1$ or $T_2$, $\alpha_2$ held by the other party and which it has not recovered.

Indeed, the portion may also recover the pledging tokens of the corresponding parameters and verify the integrity from the tokens.

Inference of $F(A,B)$ is accomplished, when F is a sum of sub-functions, by the operation:

$$F(A,B)=\alpha_1^{-1}(T_1-R_1)$$

or $$F(A,B)=\alpha_2^{-1}(T_2-R_2)$$

Inference of $F(A,B)$ is accomplished, when F is a product of sub-functions, by the operation:

$$F(A, B) = (T_1 R_1^{-1})^{\frac{1}{\alpha_1}}$$

or $$F(A, B) = (T_2 R_2^{-1})^{\frac{1}{\alpha_2}}$$

In the case when the calculated function is a fraction of functions, the calculation of $F(A,B)$ is accomplished by first calculating the numerator, and then the denominator of the function.

The result of the function evaluated in A and B is therefore held by one of the parties without any portion having revealed any information to the other portion on the datum which it holds.

Figure 3A:
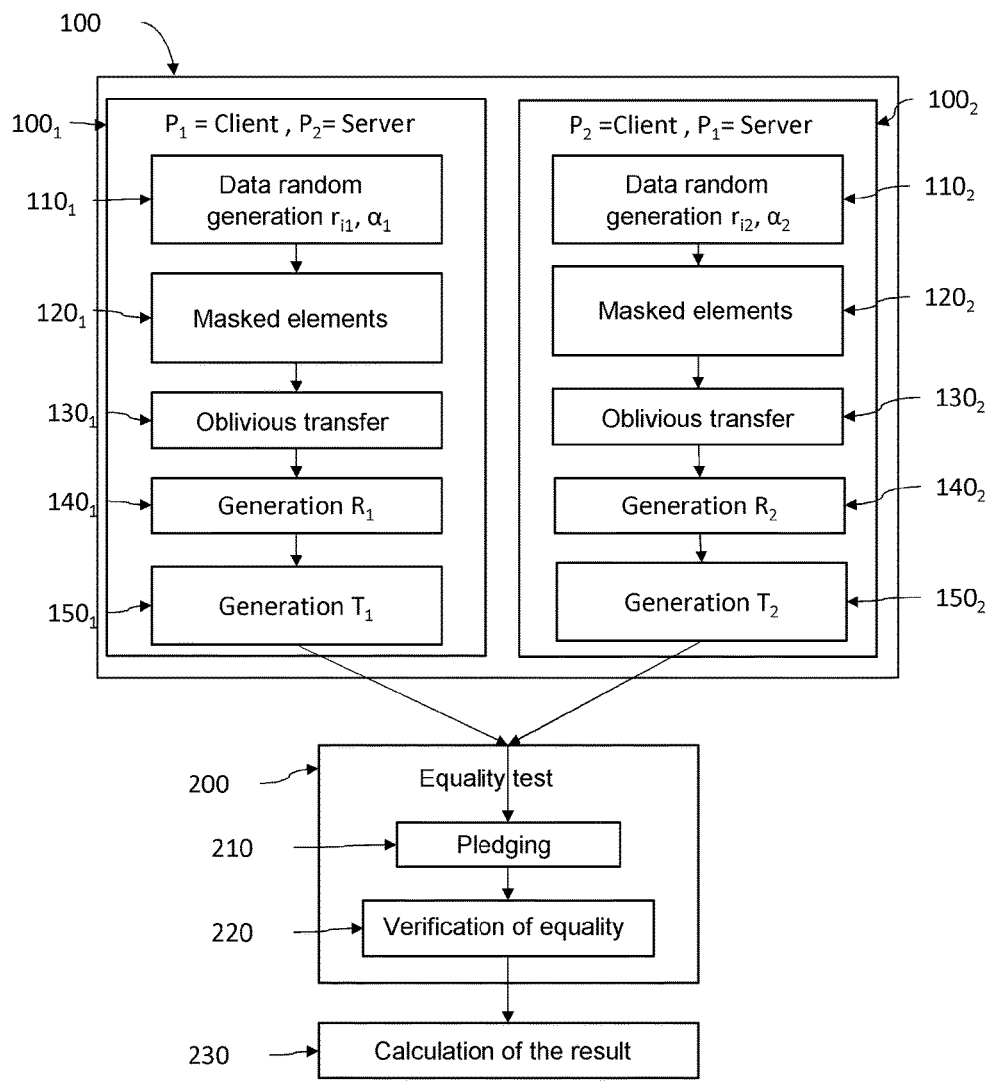
Figure 3B:
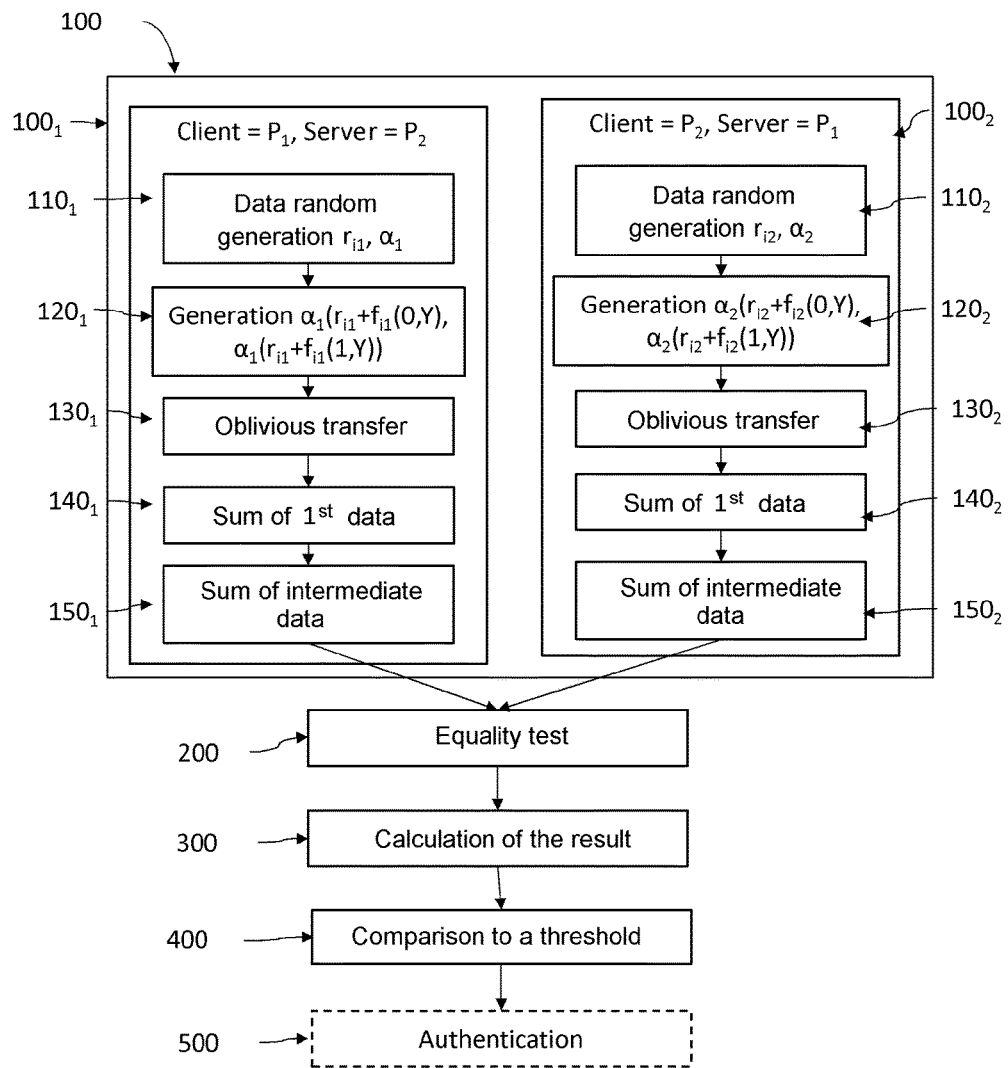

In FIG. 3b, in the case when the calculation of the function F is applied during a method for authenticating an individual, the result $F(A,B)$ may be compared with a predetermined threshold during a step 400. For example, in the case when the function is a Hamming distance, the result may be less than a determined threshold so that the data are considered as stemming from the same person.

If the result of the comparison indicates that the data A and B stem from the same person, the individual is authenticated as the reference individual during a step 500. Otherwise, warning steps may be applied by one of the parties, for example by means of the display of a message, of the generation of an audio alarm, etc.

The invention claimed is:

1. A method for executing a cryptographic calculation applied by two processing units each comprising processing means, and each having a vector comprising a number n of indexed components,
   the method comprising the secure evaluation of a function F obtained by applying to n sub-functions $f_i$ of several variables of an operation, called first operation with the vectors of each processing unit as inputs of the function,
   the method being characterized in that it comprises:
   application of a series of secure calculation steps in which a processing unit assumes a role of a client and the other processing unit assumes a role of a server, and repetition of the series of secure calculation steps in which the roles of client and of server are exchanged between the two processing units, each series of steps comprising:
- a) randomly generating, by the server, n first masking data, in the set $\mathbb{Z}_m$ with m being a prime number, invertible for the first operation, and a second masking datum in the set $\mathbb{Z}_m$, invertible for a second operation, different from the first operation, and distributive relatively to the latter,
- b) for each sub-function $f_i$, generating by the server a set of elements, each element being formed by:
  a result of the sub-function $f_i$ evaluated at the vector of the server and a vector which may be held by the client,
  masked by a first masking datum, the masking being obtained by applying the first operation between the result and the first masking datum, and
  masked by the second masking datum, the masking being applied by application between the result masked by the first masking datum and the second masking datum of the second operation,
- c) recovering by oblivious transfer, by the client, for each component of the vector held by the client, an intermediate datum corresponding to one of the elements generated by the server and indexed by the value of said component,
- d) generating, by the server, a first result portion, by:
  masking each first masking datum with the second masking datum, and
  applying to all said first masked data the first operation, and
- e) generating, by the client, a second result portion, by applying to all the intermediate data of the first operation, said second result portion comprising a masked evaluation of the function F with the vectors of the two processing units as inputs, applying, by two processing units, an equality test on the masked evaluations of the function F obtained at the end of each series of steps, and if the equality test succeeds, calculating, by one of the two processing units, the function evaluated with the data of the two processing units F(A,B) from the first and second result portions, and using the function evaluated with the data of two processing units in at least one application from among the group comprising a cryptographic application, an identification application, and an authentication application.

2. The method according to claim 1, wherein the application of both series of steps is carried out simultaneously.

3. The method according to claim 1, wherein the calculation step by one of two processing units, of F(A,B) comprises obtaining by one party, of the result portion held by the other processing unit, and inference of F(A,B) from both result portions.

4. The method according to claim 1, wherein the function to be evaluated is a fraction of functions, and the steps for applying and repeating the series of steps are carried out once for the numerator of the fraction, and once for the denominator.

5. The method according to claim 1, wherein the first operation is an addition or a multiplication, and the second operation is a multiplication or raising to a power, respectively.

6. The method according to claim 5, wherein the function F is a sum of the n sub-functions $f_i$, and the application of each series of steps comprises:
- during step b), each element is formed by the sum of a possible result of the sub-function $f_i$ evaluated at the datum of the client and the datum of the server and of a first masking datum, and multiplied by the second masking datum,
- during step d), the first party of the result is generated by the server by summing all the first masking data and by multiplying by the second masking datum, and
- during step e), the second party of the result is generated by the client by summing all the intermediate data.

7. The method according to claim 5, wherein the function to be evaluated is one from among the following group:
- a Hamming distance between the vectors of the portions,
- a normalized Hamming distance between the vectors of the portions,
- a scalar product between the vectors of the portions.

8. The method according to claim 7, wherein the vectors of the processing units are identity data of individuals, and the use of the evaluated function comprises:
- comparing the value F(X,Y) with a pre-established threshold depending on the nature of the evaluated function, and
- from a result of said comparison, determining whether the identity data correspond or not to a same individual.

9. The method according to claim 8, wherein the identity data of individuals are data coded on biometric traits of individuals.

10. The method according to claim 7, wherein each sub-function $f_i$ is a function of two variables, the components of the data held by the processing units are integers comprised between 0 and q−1, and:
- step b) comprises the generation by the server of a set comprising the elements:

$$(\alpha(r_i+f_i(0,Y)), \ldots \alpha(r_i+f_i(q-1,Y)))$$

wherein Y is the vector held by the server, and
the recovered intermediate datum during step c) is:

$$\alpha(r_i+f_i(x_i,Y))$$

11. The method according to claim 1, wherein the function to be evaluated is a product of the n sub-functions $f_i$, and the application of each series of steps comprises:
- during step b), each element is formed by the product of a possible result of the sub-function $f_i$ evaluated in the datum of the client and the datum of the server and of a first masking datum, and raising to a power of the second masking datum,
- during step d), the first party of the result is generated by the server by a product of all the first masking data and raising to a power of the second masking datum, and
- during step e), the second party of the result is generated by the client by a product of all the intermediate data.

12. The method according to claim 11, wherein each sub-function $f_i$ is a function of two variables, the components of the data held by the processing units are integers comprised between 0 and q−1, and:
- step b) comprises the generation by the server of a set comprising the elements:

$$(r_i f_i(0,Y))^\alpha, \ldots, (r_i f_i(q-1,Y))^\alpha$$

wherein Y is the vector held by the server, and
the recovered intermediate datum during step c) is:

$$(r_i f_i(x_i,Y))^\alpha$$

13. A non-transitory computer program product, comprising code instructions for executing, by a processor of a processing unit, a method comprising the application of a series of steps comprising:
- randomly generating n first data $r_i$ in the set $\mathbb{Z}_m$ with m being a prime number, and invertible for a first operation, and a second datum belonging to the set of the invertible elements of $\mathbb{Z}_m$ for a second operation, different from the first operation and distributive relatively to the latter,
- for each i from 1 to n, generating a set of elements, each element being formed by:
    - a possible result of a function $f_i$ evaluated at an unknown datum and a known datum,
    - masked by a first masking datum, the masking being obtained by applying the first operation between the first datum and the result, and
    - masked by the second masking datum, the masking being applied by application between the result masked by the first masking datum and the second masking datum of the second operation,
- participating in an oblivious transfer protocol with a distinct processing unit for communicating, for each i from 1 to n, an element from among the generated elements.

14. A method for authenticating an individual, applied by an authentication system including a first processing unit holding an identity datum of the individual, and a second processing unit holding an identity datum of a reference individual, the method comprising the application of the data processing method according to claim 1 by the processing units from two identity data, the function to be evaluated being selected from among the group comprising:
- a Hamming distance between the vectors of the portions,
- a normalized Hamming distance between the vectors of the portions,
- a scalar product between the vectors of the portions.

15. A system for authenticating an individual, comprising a first processing unit and a second processing unit, each processing unit comprising a processor and a communication interface,
- the system being characterized in that the first and the second processing unit are adapted for applying the data processing method according to claim 1, the function to be evaluated being selected from the group comprising:
    - a Hamming distance between the vectors of the portions,
    - a normalized Hamming distance between the vectors of the portions,
    - a scalar product between the vectors of the portions.

* * * * *